United States Patent
Salyer

(10) Patent No.: US 6,402,982 B1
(45) Date of Patent: Jun. 11, 2002

(54) PHASE CHANGE COMPOSITION CONTAINING A NUCLEATING AGENT

(75) Inventor: Ival O. Salyer, Dayton, OH (US)

(73) Assignee: Energy Storage Technologies Inc., Dayton, OH (US)

( * ) Notice: Subject to any disclaimer, the term of this patent is extended or adjusted under 35 U.S.C. 154(b) by 0 days.

(21) Appl. No.: 09/824,504

(22) Filed: Apr. 2, 2001

(51) Int. Cl.[7] .................................................. C09K 5/06
(52) U.S. Cl. ............................ 252/70; 62/337; 62/437; 62/457.9; 126/263.01; 165/104.11; 165/104.17; 165/104.21; 165/902
(58) Field of Search ............................ 252/70; 62/337, 62/437, 457.9; 126/263.01; 165/104.11, 104.17, 104.21, 902

(56) References Cited

U.S. PATENT DOCUMENTS

| | | | |
|---|---|---|---|
| 4,613,444 A | | 9/1986 | Lane et al. ................... 252/70 |
| 4,619,778 A | * | 10/1986 | Chalk et al. .................. 252/70 |
| 4,690,769 A | | 9/1987 | Lane et al. ................... 252/70 |
| 5,765,389 A | * | 6/1998 | Salyer ......................... 62/434 |
| 5,943,876 A | | 8/1999 | Meyer et al. ................. 62/371 |
| 5,950,450 A | | 9/1999 | Meyer et al. ............... 62/457.9 |
| 5,976,400 A | * | 11/1999 | Muffett et al. ................ 252/70 |
| 6,079,404 A | | 6/2000 | Salyer .................... 126/263.03 |

OTHER PUBLICATIONS

Chamoun et al, "Control of Sub–Cooling of NaCl", IEA, ECES la; Annex 10, Phase Change Materials and Chemical Reactions for Thermal Energy Storage. 6th Workshop (Nov. 22–24, 2000).*

Kakiuchi et al, "A Study of Erythritol As Phase Change Material", IEA Annex 10, Phase Change Materials and Chemical Reactions for Therma Energy Storage, 2nd Workshop (Nov. 11–13, 1998).*

\* cited by examiner

*Primary Examiner*—Anthony Green
(74) *Attorney, Agent, or Firm*—Killworth, Gottman, Hagan & Schaeff, L.L.P.

(57) ABSTRACT

A phase change composition is provided which includes a nucleating agent to reduce supercooling of the composition. The phase change composition may comprise a eutectic mixture of water and sodium chloride. The nucleating agent may comprise calcium oxide, calcium hydroxide, or pentaerythritol. The phase change composition may also include silica particles such that it is provided in the form of a gel or powder. The phase change composition may be used in a variety of applications including thermal shipping containers.

22 Claims, No Drawings

PHASE CHANGE COMPOSITION CONTAINING A NUCLEATING AGENT

BACKGROUND OF THE INVENTION

This invention relates to a phase change composition for thermal energy storage. More particularly, the invention relates to a water/salt phase change composition including a nucleating agent to reduce supercooling of the composition.

Phase change materials are known which may be repeatedly converted between solid and liquid phases and utilize their latent heats of fusion to absorb, store and release energy to heat or cool during such phase conversions. These latent heats of fusion are greater than the sensible heat capacities of the materials. For example, in phase change materials, the amount of energy absorbed upon melting or released upon freezing is much greater than the amount of energy absorbed or released upon increasing or decreasing the temperature of the material over an increment of 10° C.

Upon melting and freezing, per unit weight, a phase change material (PCM) absorbs or releases substantially more energy than a sensible heat storage material that is heated or cooled over generally the same temperature range. In contrast to a sensible heat storage material that absorbs and releases energy essentially uniformly over a broad temperature range, a phase change material absorbs and releases a large quantity in the vicinity of its melting/freezing point.

Phase change materials capable of storing and releasing useful amounts of energy at low temperatures have found many applications including beverage and food containers, medical wraps, and containers used to transport and store temperature-sensitive materials such as vaccines and other medicines. For example, a refrigeration system utilizing a phase change material is described in U.S. Pat. No. 5,950,450.

It is also known to use water/salt solutions as phase change materials. Eutectic water/salt solutions are useful in providing a low freezing temperature and high thermal energy storage. However, a limitation of water/salt phase change compositions is that they exhibit pronounced supercooling, i.e., cooling below their normal freezing point. In some instances, supercooling reduces the freezing temperature to about −31° C., which is outside the operating range of commercial refrigerators or freezers. Thus, special freezers, or a very low freezing material such as dry ice, must be used to freeze the material.

Nucleating agents such as barium and strontium salts have been proposed for use in salt hydrate phase change materials for the purpose of reducing supercooling. See, for example, U.S. Pat. No. 4,690,769 and U.S. Pat. No. 4,613,444.

However, there is still a need in the art for a phase change composition which provides a low freezing temperature and high thermal energy storage without the problem of supercooling.

SUMMARY OF THE INVENTION

The present invention meets that need by providing a water/salt phase change composition which includes a nucleating agent to prevent supercooling of the composition. The resulting composition melts at a temperature of about −20° C. and freezes at a temperature of about −25° C., and may be used in a number of thermal energy storage applications.

According to one aspect of the present invention, a phase change composition is provided comprising a eutectic mixture of water and sodium chloride, and a nucleating agent in an amount of from about 0.1 to 5 weight percent. Preferably, the phase change composition includes about 1% by weight of the nucleating agent. The nucleating agent functions to reduce supercooling of the phase change composition, and is selected from the group consisting of calcium oxide, calcium hydroxide and pentaerythritol. With the addition of the nucleating agent, the phase change composition melts and freezes at a temperature between about −20° C. and about −25° C.

In a preferred embodiment of the invention, the eutectic mixture comprises about 72.7 weight percent water and 27.3 weight percent sodium chloride.

However, the mixture of water and sodium chloride does not have to be a eutectic mixture. Other mixtures of water and sodium chloride may be used in combination with a nucleating agent to provide a phase change composition having a freezing temperature of between −0.58 and −20° C. The desired freezing temperature may be varied by varying the amount of NaCl included in the mixture.

In another embodiment of the invention, the phase change composition further includes from about 10 to 20% by weight hydrophilic silica particles such that the phase change composition is in the form of a gel.

In yet another embodiment of the invention, the phase change composition further includes from about 25 to 35% by weight hydrophilic silica particles such that the phase change composition is in the form of a dry powder.

In another embodiment of the invention, the phase change composition may further include a water soluble thickening agent selected from the group consisting of polyvinyl alcohol, polyacrylic acid, polymethacrylic acid, polyethylene oxide, vinyl acetate/maleic anhydride copolymers, and gelatin.

The phase change composition of the present invention may be imbibed into porous substrates such as open cell foams, gypsum board, concrete, cellulose porous structures including paper, particle board, and cellulosic ceiling tiles, cotton batting, fibers and fabrics. In this embodiment, the phase change composition preferably includes a water soluble thickening agent.

The phase change composition may also be disposed in a shipping or storage container, such as a container comprising insulated panels. Preferably, the insulated panels are vacuum panels and have an R value per inch of at least 25.

The present invention also provides a method of making a phase change composition which comprises providing a mixture of water and sodium chloride; and adding a nucleating agent in an amount of from about 0.1 to 5 weight percent. The method may also include the addition of hydrophilic silica particles to form a gel or dry powder, or the addition of a water soluble thickening agent for embodiments in which the phase change composition is imbibed into a porous substrate.

Accordingly, it is a feature of the present invention to provide a phase change composition including a nucleating agent which reduces supercooling and allows the phase change composition to be used in a number of thermal storage applications including shipping or storage containers. It is also a feature of the present invention to provide a method of making such a phase change composition. Other features and advantages of the invention will be apparent from the following description and the appended claims.

DETAILED DESCRIPTION OF THE PREFERRED EMBODIMENT

The phase change composition of the present invention comprises a water/sodium chloride eutectic mixture which can store and release useful amounts of energy at temperatures of about −21° C. The eutectic water/salt mixture provides a low freezing temperature and high thermal energy storage. While a eutectic mixture of 72.7% water/ 27.3% salt is preferred, it should be appreciated that compositions containing less than 27.3% salt may also provide useful thermal energy storage at temperatures between the −21° C. melt/freeze temperature of the eutectic mixture and that of water (0° C.).

Heretofore, a limitation of water/sodium chloride phase change compositions is that they exhibited pronounced supercooling of up to 12° C., which reduces the freezing temperature to about −31° C. With the addition of a nucleating agent, the supercooling is reduced such that the phase change composition melts and freezes at a temperature between about −20° C. and −25° C.

The phase change composition of the present invention may also incorporate silica particles in order to provide the phase change composition in the form of a gel or dry powder. Preferred silica particles for use in the present invention include fumed or precipitated hydrophilic silicas having a particle size of about 0.005 to 0.025 microns and a surface area of 100 m$^2$ or more. An example is ABS silica from PPG Industries of Pittsburgh, Pa., which is a normal, hydrophilic silica having a surface area of 150 m$^2$/gram and a particle size of about 0.022 microns. Other suitable silicas include Cabot EH-5 silica available from Cabot Corporation, which has a surface area of 350 m$^2$/gram, and LS-500 available from DeGussa, which has a surface area of 500 m$^2$. Also suitable is BXS-318 AND BXS 384, commercially available from PPG.

Where it is desirable to use the phase change composition in the form of a gel, the silica is preferably included in the phase change composition in an amount of from about 10 to 20% by weight. Where it is desirable to use the phase change composition in the form of a powder, the silica is preferably added to the phase change composition in an amount of from about 25 to 35% by weight.

The resulting phase change composition may be contained in an insulated shipping container for use in transporting temperature sensitive products. For example, the phase change material may be incorporated in an insulating vacuum panel such as that described in U.S. Pat. Nos. 5,943,876 and 5,950,450, both of which are incorporated herein by reference.

The phase change composition of the present invention may also be imbibed into porous substrates such as open cell foams, gypsum board, concrete, cellulose porous structures including paper, particle board, and cellulosic ceiling tiles, cotton batting, fibers and fabrics. In this embodiment, the phase change composition preferably includes a water soluble thickening agent selected from the group consisting of polyvinyl alcohol, polyacrylic acid, polymethacrylic acid, polyethylene oxide, vinyl acetate/maleic anhydride copolymers, and gelatin.

In order that the invention may be more readily understood, reference is made to the following examples which are intended to illustrate the invention, but not limit the scope thereof

EXAMPLE 1

A water/sodium chloride phase change composition was prepared in accordance with the present invention using a eutectic mixture of water/sodium chloride, with and without the addition of a nucleating agent. The effect of the nucleating agent on the melting and freezing temperatures of the phase change composition is illustrated in Table 1.

TABLE 1

| Material | Freeze peak temperature (° C.) | $\Delta H_c$ (cal/g) | Melt peak temperature (° C.) | $\Delta H_f$ (cal/g) | Supercooling (° C.) |
|---|---|---|---|---|---|
| Water/NaCl | −31.3 | 42.0 | −19.8 | 44.7 | 11.8 |
| Water/NaCl + 1% pentaerythritol | −25.1 | 47.4 | −19.8 | 49.3 | 5.3 |
| Water/NaCl + 1% CaO | −23.4 | 46.2 | −20.4 | 46.8 | 3.0 |

As can be seen, both pentaerythritol and calcium oxide are effective nucleating agents for the water/salt mixture, i.e. supercooling is substantially reduced. In addition, it was found that pentaerythritol was effective in lowering the freeze times for the water/salt phase change composition (measured by differential scanning calorimetry).

EXAMPLE 2

Water/sodium chloride/silica phase change compositions were prepared in accordance with the present invention using a eutectic mixture of water/sodium chloride, with and without the addition of a nucleating agent. The effect of the nucleating agent on the melting and freezing temperatures of the phase change compositions is illustrated in Table 2.

TABLE 2

| Material | Freeze peak temperature (° C.) | $\Delta H_c$ (cal/g) | Melt peak temperature (° C.) | $\Delta H_f$ (cal/g) | Supercooling (° C.) |
|---|---|---|---|---|---|
| Water/NaCl/ABS | −32.2 | 30.6 | −19.4 | 32.6 | 12.8 |
| Water/NaCl/BXS 318 | −30.0 | 30.3 | −20.3 | 29.8 | 9.7 |
| Water/NaCl/ABS + 1% pentaerythritol | −26.8 | 30.5 | −21.6 | 28.6 | 5.2 |

The test results indicate that pentaerythritol is an effective nucleating agent for water/salt/silica phase change compositions.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A phase change composition comprising a eutectic mixture of water and sodium chloride and a nucleating agent in an amount of from about 0.1 to 5 weight percent, said nucleating agent selected from the group consisting of calcium oxide, calcium hydroxide and pentaerythritol.

2. The phase change composition of claim 1 including about 1% by weight of said nucleating agent.

3. The phase change composition of claim 1 comprising about 72.7 weight percent water and 27.3 weight percent sodium chloride.

4. The phase change composition of claim 1 wherein said nucleating agent reduces supercooling such that said composition melts and freezes at a temperature between about −20 C and about −25° C.

5. The phase change composition of claim 1 further including from about 10 to 20% by weight hydrophilic silica particles, wherein said phase change composition is in the form of a gel.

6. The phase change composition of claim 1 further including from about 25 to 35% by weight hydrophilic silica particles, wherein said phase change composition is in the form of a dry powder.

7. The phase change composition of claim 1 further including a water soluble thickening agent selected from the group consisting of polyvinyl alcohol, polyacrylic acid, polymethacrylic acid, polyethylene oxide, vinyl acetate/maleic anhydride copolymers, and gelatin.

8. A porous substrate imbibed with the phase change composition of claim 1.

9. The porous substrate of claim 8 wherein said phase change composition includes a water soluble thickening agent.

10. A shipping or storage container having disposed therein the phase change composition of claim 1.

11. The container of claim 10 further comprising insulated panels.

12. The container of claim 11 wherein said insulated panels have an R value per inch of at least 25.

13. The container of claim 12 wherein said insulated panels are vacuum panels.

14. A method of making a phase change composition comprising:
   providing a mixture of water and sodium chloride; and
   adding a nucleating agent in an amount of from about 0.1 to 5 weight percent, wherein said nucleating agent is selected from the group consisting of calcium oxide, calcium hydroxide, and pentaerythritol.

15. The method of claim 14 wherein said mixture comprises about 72.7 weight percent water and 27.3 weight percent sodium chloride.

16. The method of claim 14 wherein said mixture further includes from about 10 to 20% by weight hydrophilic silica particles, and wherein said phase change composition is in the form of a gel.

17. The method of claim 14 wherein said mixture further includes from about 25 to 35% by weight hydrophilic silica particles, and wherein said phase change composition is in the form of a dry powder.

18. The method of claim 14 wherein said mixture further includes a water soluble thickening agent selected from the group consisting of polyvinyl alcohol, polyacrylic acid, polymethacrylic acid, polyethylene oxide, vinyl acetate/maleic anhydride copolymers, and gelatin.

19. A method of making a thermal energy storage material comprising:
   providing a eutectic mixture of water and sodium chloride and a nucleating agent to form a phase change composition; and
   imbibing said phase change composition into a porous substrate.

20. The method of claim 19 wherein said phase change composition includes a water soluble thickening agent.

21. A phase change composition comprising a mixture of water and sodium chloride and a nucleating agent in an amount of from about 0.1 to 5 weight percent, said nucleating agent selected from the group consisting of calcium oxide, calcium hydroxide and pentaerythritol.

22. The phase change composition of claim 21 in which said mixture freezes at a temperature of between about −0.58 to and −20.0° C.

* * * * *